United States Patent
Smith

(10) Patent No.: US 6,674,487 B1
(45) Date of Patent: Jan. 6, 2004

(54) CONTROLLING HUE USING A SATURATION CONTROL CIRCUIT

(75) Inventor: Alexander V. Smith, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,047

(22) Filed: Mar. 31, 2000

(51) Int. Cl.$^7$ .................................................. H04N 9/64
(52) U.S. Cl. ...................................... 348/649; 348/651
(58) Field of Search ................................. 348/649, 650, 348/651, 652, 653, 654, 645, 646, 647, 688

(56) References Cited

U.S. PATENT DOCUMENTS

| 4,916,531 | A | * | 4/1990 | Genz et al. ................. 358/520 |
| 5,153,711 | A | * | 10/1992 | DesJardins .................. 348/649 |
| 5,161,005 | A | * | 11/1992 | Harradine .................... 348/649 |
| 5,282,021 | A | * | 1/1994 | Bachmann et al. ......... 348/645 |
| 5,894,329 | A | * | 4/1999 | Takeda et al. .............. 348/446 |
| 5,953,691 | A | * | 9/1999 | Mills ....................... 348/391.1 |
| 6,124,899 | A | * | 9/2000 | Swan et al. ................. 348/642 |
| 6,163,346 | A | * | 12/2000 | Tsyrganovich .............. 348/607 |
| 6,369,860 | B1 | * | 4/2002 | Into .......................... 348/578 |
| 6,392,713 | B1 | * | 5/2002 | Acker ........................ 348/639 |
| 6,417,891 | B1 | * | 7/2002 | Cacciatore et al. ......... 348/631 |

* cited by examiner

Primary Examiner—Michael H. Lee
(74) Attorney, Agent, or Firm—Fish & Richardson P.C.

(57) ABSTRACT

Hue is controlled using a saturation control circuit. A first color space value is adjusted based on a hue angle and a saturation value, and a second color space value is adjusted based on the hue angle and the saturation value. The first and second color space values are processed to obtain a hue-adjusted color space value.

18 Claims, 4 Drawing Sheets

CONTROLLING HUE USING A SATURATION CONTROL CIRCUIT

BACKGROUND

This invention relates to controlling hue using a saturation control circuit.

In color science, hue relates to the difference in tone of each color and same color saturation relates to the depth or intensity of the color. For example, red and blue have different hues while sky blue and ocean blue have different saturations. Changing the saturation and/or hue of colors in an image affects the way those colors are perceived.

DESCRIPTION OF THE DRAWINGS

Like reference symbols in the various drawings indicate like elements.

DETAILED DESCRIPTION

Figure 1:
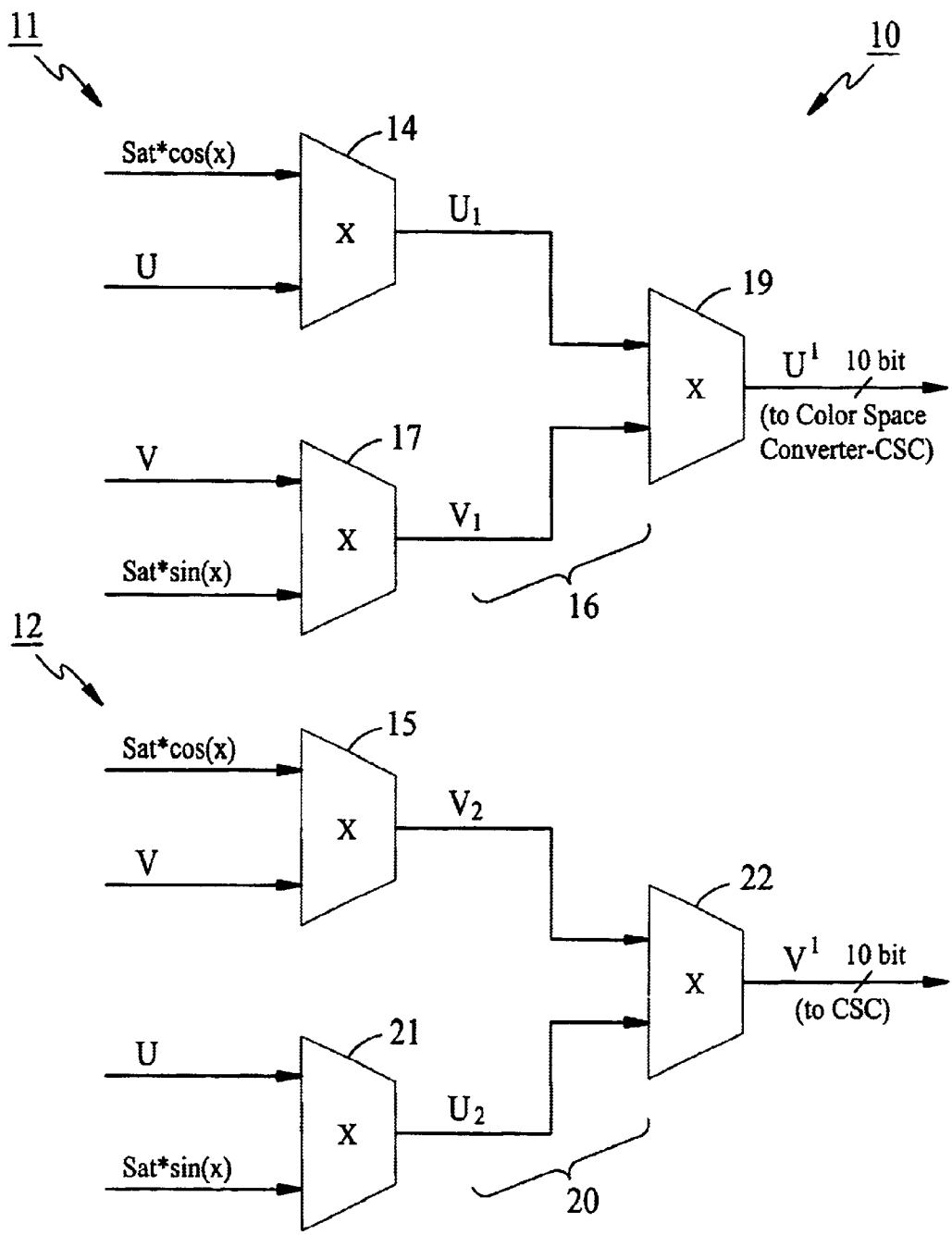
FIG. 1 shows saturation control circuitry that is also used to control hue.

Referring to FIG. 1, diagram 10 shows two circuits 11 and 12 for controlling hue and saturation of a color by adjusting CIE (Commission Internationale de l'Eclairage) Chromaticity Chart U and V color space values. Circuit 11 adjusts the U color space value to obtain a hue-adjusted color space value U', and circuit 12 adjusts the V color space value to obtain a hue-adjusted color space value V'. Circuits 11 and 12 make use of pre-existing saturation control circuits 14 and 15, respectively, to obtain the hue-adjusted color space values U' and V'.

Saturation control circuits 14 and 15 operate by multiplying a color space value, such as U for circuit 11 and V for circuit 12, by a saturation value ("Sat"). The saturation value is received from a processor or other circuitry (not shown). Multipliers are used in this embodiment to perform the multiplication of the color space value and the saturation value. Heretofore, saturation circuits (also referred to as "multipliers") 14 and 15 provided saturation-adjusted color values to a software driver, such as a graphics device driver, without regard to hue adjustments.

This embodiment of the invention uses saturation control circuits 14 and 15 also to control hue. Taking circuit 11 first, hue control circuit 16 includes multiplier 17 and adder 19. The output of multipliers 14 and 17 are added by adder 19 to produce hue/saturation-adjusted color space value U'.

Multiplier 14 receives data representing the product of the saturation value ("Sat") and the cosine of the hue angle ("COS(X)") (a conventional saturation control circuit receives only "Sat" without the value "COS(X)") The hue angle may be specified by a user or by other circuitry (not shown). The product Sat*COS(X) is determined beforehand and stored in a register or other memory, from which it is retrieved and provided to multiplier 14. Multiplier 14 also receives the U color space value. Multiplier 14 multiplies U by Sat*COS(X) to obtain a U color space value $U_1$ adjusted in accordance with the hue angle.

Multiplier 17 receives data representing the product of the saturation value ("Sat") and the sine of the hue angle ("SIN(X)"). As above, the hue angle may be specified by a user or by other circuitry. The product Sat*SIN(X) is determined beforehand and stored in a register or other memory, from which it is retrieved and provided to multiplier 17. Multiplier 17 also receives the V color space value. Multiplier 17 multiplies V by Sat*SIN(X) to obtain a V color space value $V_1$ adjusted in accordance with the hue angle.

$U_1$ and $V_1$ are provided to adder 19, where they are added to produce hue/saturation-adjusted color space value U'. U' is provided to a color space converter or other software driver, such as a graphics device driver, running on a processor (not shown).

Circuit 12 operates in substantially the same manner as circuit 11, except that it produces a hue/saturation-adjusted color space value V' based on U and V values and the input hue angle. More specifically, hue control circuit 20 includes multiplier 21 and subtractor 22. The difference between the outputs of multipliers 15 and 21 are determined by subtractor 22 to produce hue/saturation-adjusted color space value V'.

Multiplier 15 receives data representing the product of the saturation value ("Sat") and the cosine of the hue angle ("COS(X)"). The hue angle may be specified by a user or by other circuitry (not shown). The product Sat*COS(X) is determined beforehand and stored in a register or other memory, from which it is retrieved and provided to multiplier 15. Multiplier 15 also receives the V color space value. Multiplier 15 multiplies V by Sat*COS(X) to obtain a V color space value $V_2$ adjusted in accordance with the hue angle.

Multiplier 21 receives data representing the product of the saturation value ("Sat") and the sine of the hue angle ("SIN(X)"). As above, the hue angle may be specified by a user or by other circuitry. The product Sat*SIN(X) is determined beforehand and stored in a register or other memory, from which it is retrieved and provided to multiplier 21. Multiplier 21 also receives the U color space value. Multiplier 21 multiplies U by Sat*SIN(X) to obtain a U color space value $U_2$ adjusted in accordance with the hue angle.

$U_2$ and $V_2$ are provided to subtractor 22, where the difference between them is determined to produce hue/saturation-adjusted color space value V'. V' is provided to a color space converter or other software driver, such as a graphics device driver, running on a processor (not shown).

Thus, the equations for U' and V' are as follows:

$$U'=U*Saturation*cos(X)+V*Saturation*SIN(X)$$

$$V'=V*Saturation*COS(X)-U*Saturation*SIN(X)$$

A round-up constant, such as ½, may be added to both the equations for U' and V' to prevent "rounding down" of the resulting value due to bit truncation. Although the example given is ½, a different value may be used depending upon the circumstances In a case where hue adjustment is not performed, the hue angle X is zero degrees. Accordingly, COS(0)=1 and SIN(0)=0. In the above equations for U' and V', this yields $$U'=U*Saturation*1+V*Saturation*0$$

$$V'=V*Saturation*1-U*Saturation*0,$$

or $$U'=U*Saturation$$

$$V'=V*Saturation,$$

with any necessary constants (e.g., ½) added. Thus, if hue is not adjusted, saturation can still be adjusted using circuits 14 and 15 (since the logic for both has the same data path).

Figure 2:
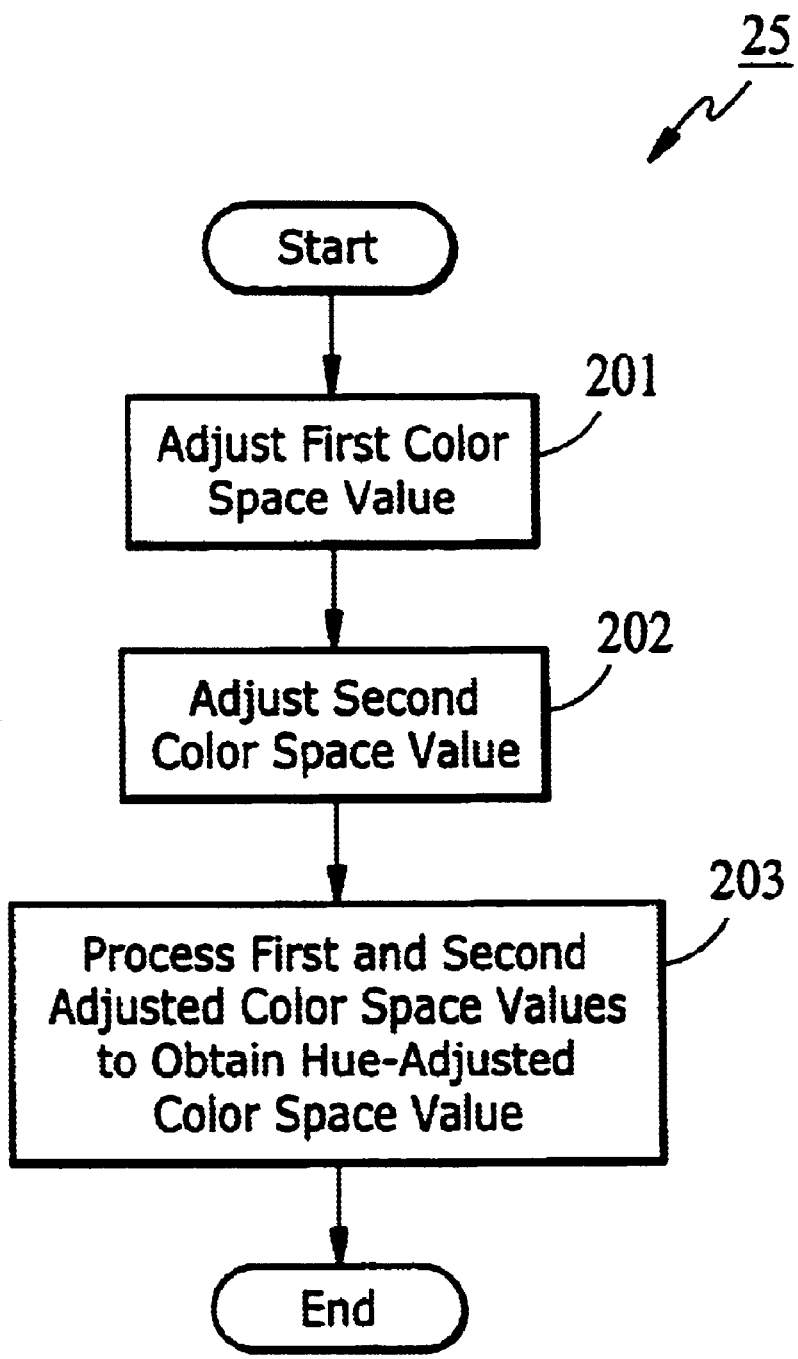
FIG. 2 is a flowchart showing a process for controlling saturation and hue of a color space value.

FIG. 2 is a flowchart showing a process 25 performed by circuits 11 and 12. For example, for circuit 11, in 201, a first color space value (U) is adjusted based on a hue angle (X) and a saturation value ("Sat"). This is performed by multiplier 14. In 202, a second color space value (V) is adjusted based on the hue angle (X) and the saturation value ("Sat"). This is performed by multiplier 17. In 203, the adjusted first and second color space values ($U_1$ and $V_1$, respectively) are processed (e.g., added) by adder 19 to obtain the hue-adjusted color space value U'. Saturation can also be adjusted by changing the value of "Sat" provided to circuit 14, thus making it possible to adjust both hue and saturation using the same circuitry and to provide a single hue/saturation adjusted value. With this single value, it is possible to maintain bit precision (e.g., to ten bits) throughout an entire pixel pipeline.

Figure 3:
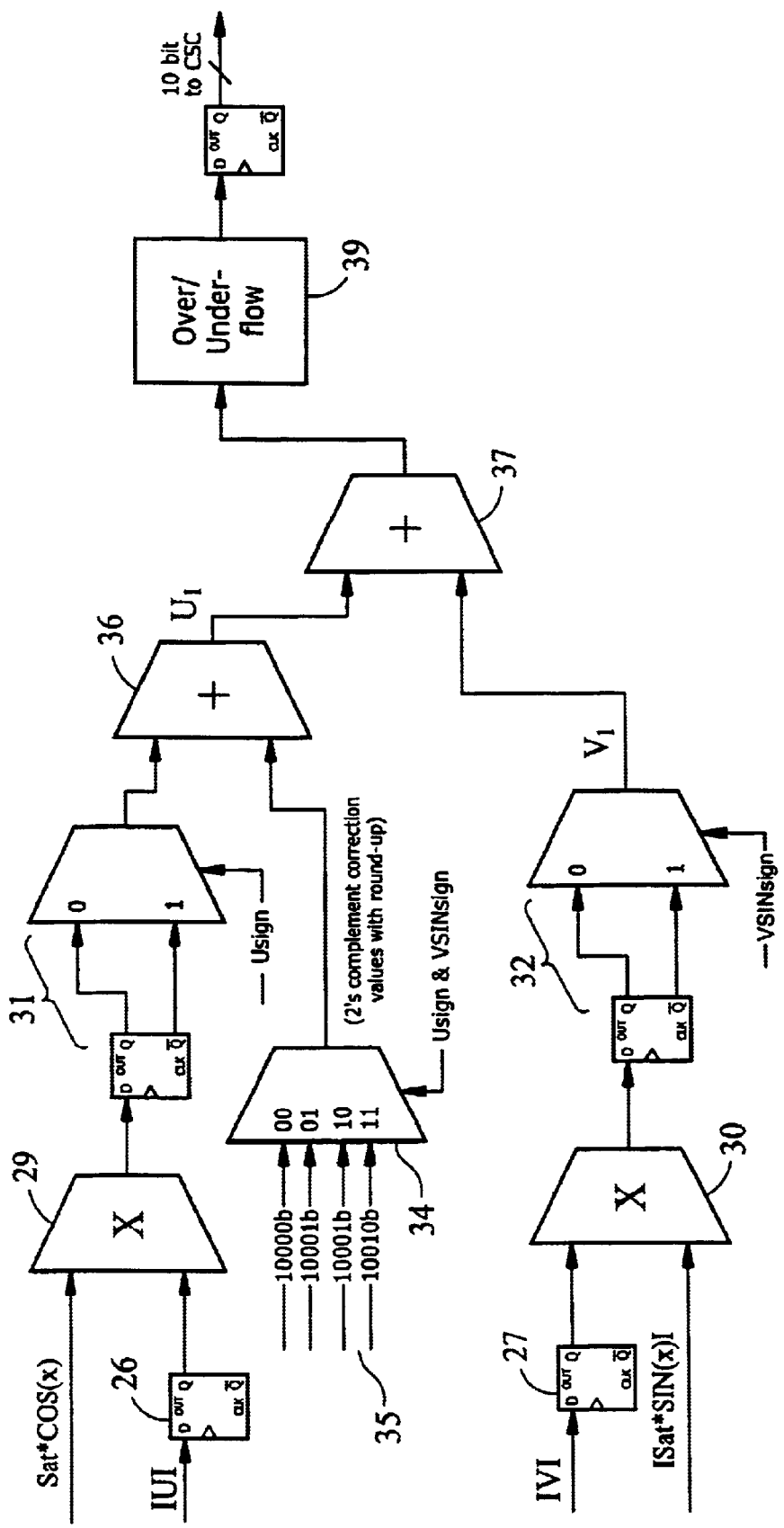
FIGS. 3 and 4 show alternative saturation control circuitry that is also used to control hue.

Referring to FIG. 3, a second embodiment is shown for obtaining a hue-adjusted U color space value according to process 25. This embodiment includes correction circuitry for converting between two's complement and sign magnitude bit representations and circuitry for controlling the number of bits output from the circuit. In this embodiment, flip-flops 26 and 27 are used to provide U and V sign magnitude inputs to multipliers 29 and 30. Flip-flop/multiplexer pairs 31 and 32 control the output of the $U_1$ and $V_1$ values based on whether the U component is negative (indicated by Usign) and whether the V component or SIN(X), but not both, are negative (indicated by VSINsign). The multiplexers are used to convert the data from sign magnitude into one's complement format. The flip-flops are specific to this embodiment, and need not necessarily be included in the circuitry.

Circuitry 34 is a multiplexer, which adds constants 35 via adder 36 for use in converting the data from one's complement values into two's complement representations, resulting in two's complement representations of $U_1$ and $V_1$. In this implementation, the constants are added through adder 36; however, they can also be added via adder 37. The constants that are added depend upon the values of Usign and VSINsign. Over/Underflow circuit 39 adds or removes bits from the resulting U' value, depending upon the bit precision required by the destination color space converter/driver.

Figure 4:
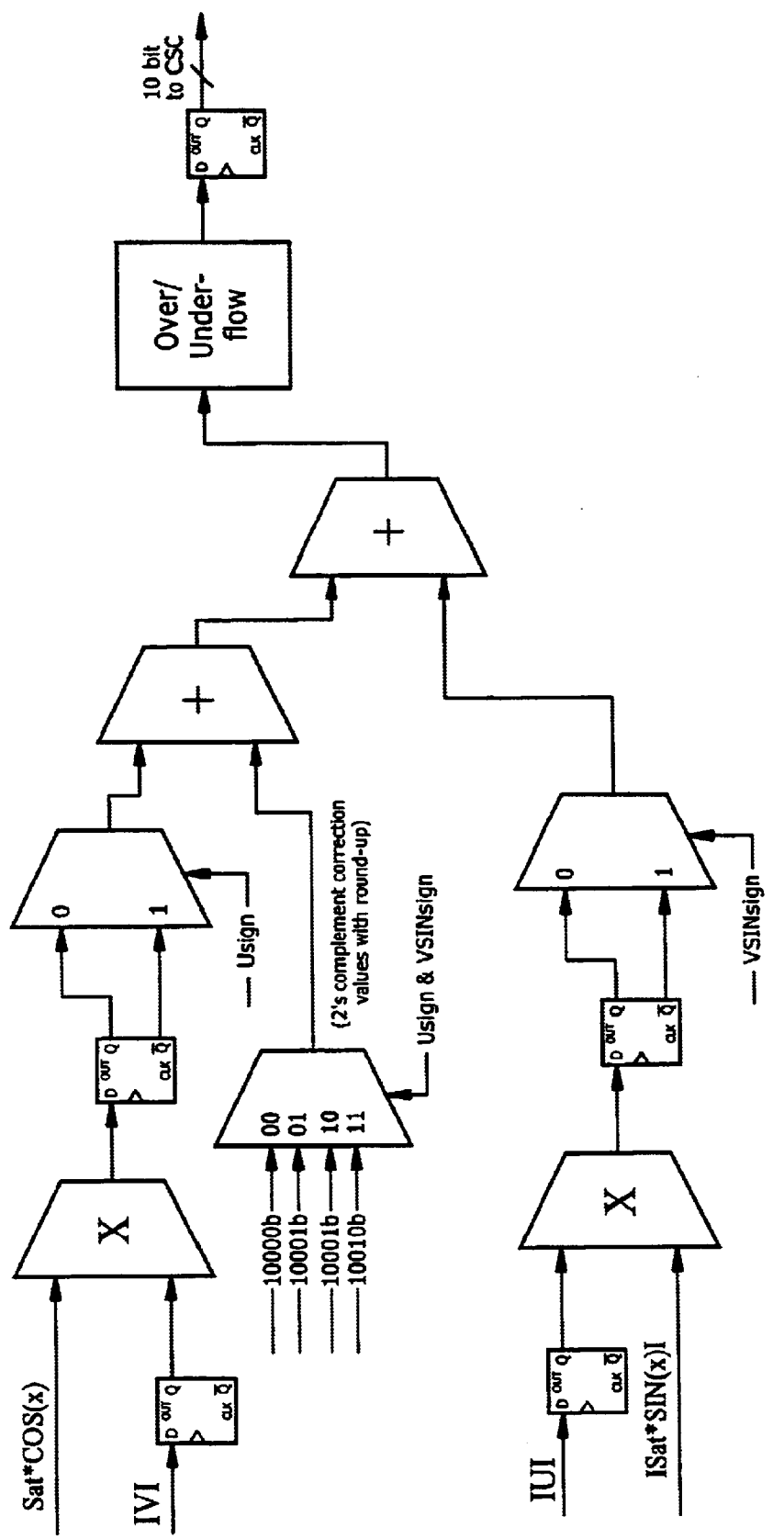

FIG. 4 shows a second embodiment for obtaining a hue-adjusted V color space value. This embodiment operates similarly to that shown in FIG. 3, except that the polarity of VSINsign is reversed and the inputs U and V are switched.

Although the invention has been described in a hardware context, it is not limited to the foregoing hardware configurations; it may find applicability in any computing or processing environment. For example, process 25 (FIG. 2) may be implemented in hardware, software, or a combination of the two. Process 25 may be implemented in one or more computer programs executing on programmable computers (not shown) that each include a processor, a storage medium readable by the processor (including volatile and non-volatile memory), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., hard disk or magnetic diskette) that is readable by a general or special purpose programmable computer for configuring and operating the computer when the storage medium or device is read by the computer to perform process 25. Process 25 may also be implemented as a computer-readable storage medium, configured with a computer program, where, upon execution, instructions in the computer program cause the computer to operate in accordance with process 25.

Other embodiments not specifically described herein are also within the scope of the following claims. For example, although the embodiment is described with respect to U and V chroma values, the invention is not limited to the CIE U/V representations. Saturation and hue adjustments can be applied to any color representations that feature two complementary chroma components. The invention can be used with bit representations other than two's complement and sign magnitude. The invention can be incorporated into other color processing circuitry (not shown), such as a graphics pipeline or the like. The invention can be used by any video streaming device which allows for both saturation and hue adjustment including, but not limited to, personal computer (PC) graphics devices and stand-alone integrated circuits for performing image manipulation. The invention can also be used to maintain any bit precision in the graphics pipeline.

What is claimed is:

1. A method of controlling hue using a saturation control circuit, comprising:
   adjusting a first color space value based on a product of a saturation value and a cosine of a hue angle to produce a first adjusted color space value;
   adjusting a second color space value based on a product of a saturation value and a sine of the hue angle to produce a second adjusted color space value;
   modifying bit representations of the first adjusted color space value and the second adjusted color space value; and
   adding the first adjusted color space value and the second adjusted color space value to obtain a hue-adjusted color space value.

2. The method of claim 1, wherein the first color space value comprises a Commission Internationale de l'Eclairage V value and the second color space value comprises a Commission Internationale de l'Eclairage U value.

3. The method of claim 1, wherein the saturation control circuit uses the same circuitry to control hue and saturation.

4. An apparatus comprising a saturation control circuit, the saturation control circuit comprising:
   first circuitry to adjust a first color space value based on a product of a saturation value and a cosine of a hue angle to produce a first adjusted color space value;
   second circuitry to adjust a second color space value based on a product of the saturation value and a sine of the hue angle to produce a second adjusted color space value;
   modification circuitry to modify bit representations of the first adjusted color space value and the second adjusted color space value; and
   third circuitry to add the first adjusted color space value and second adjusted color space value to obtain a hue-adjusted color space value.

5. The apparatus of claim 4, wherein the first color space value comprises a Commission Internationale de l'Eclairage V value and the second color space value comprises a Commission Internationale de l'Eclairage U value.

6. The apparatus of claim 4, wherein the saturation control circuit uses the same circuitry to control hue and saturation.

7. The apparatus of claim 4, wherein the modification circuitry converts between different types of bit representations of the first and second adjusted color space values.

8. An article comprising a machine-readable medium which stores executable instructions for controlling hue, the executable instructions causing a machine to:
adjust a first color space value based on a product of a saturation value and a cosine of a hue angle to produce a first adjusted color space value;
adjust a second color space value based on a product of the saturation value and the sine of the hue angle to produce a second adjusted color space value;
modify bit representations of the first adjusted color space value and the second adjusted color space value; and
add the first adjusted color space value and the second adjusted color space value to obtain a hue-adjusted color space value.

9. The article of claim 8, wherein the first color space value comprises a Commission Internationale de l'Eclairage V value and the second color space value comprises a Commission Internationale de l'Eclairage U value.

10. The method of claim 1, wherein modifying comprises converting the first adjusted color space value and the second adjusted color space value between a sign magnitude bit representation and a two's complement bit representation.

11. The method of claim 1, further comprising adding a constant to the hue-adjusted color space value.

12. The method of claim 1, further comprising adding a second hue-adjusted color space value to the hue-adjusted color space value.

13. The apparatus of claim 4, wherein modifying comprises converting the first adjusted color space value and the second adjusted color space value between a sign magnitude bit representation and a two's complement bit representation.

14. The apparatus of claim 4, further comprising circuitry to add a constant to the hue-adjusted color space value.

15. The apparatus of claim 1, further comprising an adder circuit to add a second hue-adjusted color space value to the hue-adjusted color space value.

16. The article of claim 8, wherein modifying comprises converting the first adjusted color space value and the second adjusted color space value between a sign magnitude bit representation and a two's complement bit representation.

17. The article of claim 8, further comprising instructions to add a constant to the hue-adjusted color space value.

18. The article of claim 8, further comprising instructions to add a second hue-adjusted color space value to the hue-adjusted color space value.

* * * * *